US007001961B2

(12) United States Patent
Agapiou et al.

(10) Patent No.: US 7,001,961 B2
(45) Date of Patent: Feb. 21, 2006

(54) CATALYST COMPOSITION AND METHODS FOR ITS PREPARATION AND USE IN A POLYMERIZATION PROCESS

(75) Inventors: Agapios Kyriacos Agapiou, Humble, TX (US); Chi-I Kuo, Humble, TX (US); David M. Glowczwski, Baytown, TX (US); Steven K. Ackerman, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/146,264

(22) Filed: Jun. 6, 2005

(65) Prior Publication Data

US 2005/0228151 A1 Oct. 13, 2005

Related U.S. Application Data

(62) Division of application No. 09/998,855, filed on Nov. 15, 2001, now Pat. No. 6,933,258.

(60) Provisional application No. 60/256,744, filed on Dec. 19, 2000.

(51) Int. Cl.
*C08F 4/44* (2006.01)
*C08F 4/72* (2006.01)
*C08F 4/06* (2006.01)

(52) U.S. Cl. .................. 526/110; 526/139; 526/141; 526/142; 526/144; 526/145; 526/147; 526/160; 526/943

(58) Field of Classification Search ................ 502/121, 502/123–129, 132; 526/110, 139, 141, 142, 526/144, 145, 147
See application file for complete search history.

(56) References Cited

U.S. PATENT DOCUMENTS

| | | | |
|---|---|---|---|
| 3,082,198 A | 3/1963 | Klein .................... 260/94.9 |
| 3,919,185 A | 11/1975 | Takebe et al. ............. 260/93.7 |
| 3,997,707 A | 12/1976 | Aruga et al. ................. 526/62 |
| 4,012,574 A | 3/1977 | Jones et al. .................... 526/74 |
| 4,397,761 A * | 8/1983 | McDaniel et al. .......... 502/107 |
| 4,532,311 A | 7/1985 | Fulks et al. ................... 526/62 |
| 4,536,487 A * | 8/1985 | Speca ......................... 502/119 |
| 4,792,592 A | 12/1988 | Fulks et al. ................... 526/62 |
| 4,803,251 A | 2/1989 | Goode et al. ................. 526/59 |
| 4,855,370 A | 8/1989 | Chirillo et al. ............... 526/74 |
| 4,876,320 A | 10/1989 | Fulks et al. ................... 526/62 |
| 5,026,795 A | 6/1991 | Hogan ......................... 526/74 |
| 5,034,480 A | 7/1991 | Funk et al. .................... 526/74 |
| 5,034,481 A | 7/1991 | Funk et al. .................... 526/74 |
| 5,066,736 A | 11/1991 | Dumain et al. ............... 526/82 |
| 5,073,531 A | 12/1991 | Witt ........................... 502/228 |
| 5,075,394 A * | 12/1991 | McDaniel et al. ............ 526/96 |
| 5,126,414 A | 6/1992 | Cooke et al. ................. 526/68 |
| 5,283,278 A | 2/1994 | Daire et al. .................. 524/399 |
| 5,296,564 A | 3/1994 | Derleth et al. .............. 526/113 |
| 5,332,706 A | 7/1994 | Nowlin et al. .............. 502/107 |
| 5,391,657 A | 2/1995 | Song et al. .................... 526/74 |
| 5,410,002 A | 4/1995 | Govoni et al. ................. 526/88 |
| 5,427,991 A | 6/1995 | Turner ........................ 502/103 |
| 5,461,123 A | 10/1995 | Song et al. .................... 526/74 |
| 5,473,028 A | 12/1995 | Nowlin et al. .............. 526/114 |
| 5,492,975 A | 2/1996 | Peifer et al. ................. 525/274 |
| 5,610,244 A | 3/1997 | Govoni et al. ................. 526/65 |
| 5,627,243 A | 5/1997 | Hämäläinen et al. ......... 526/68 |
| 5,643,847 A | 7/1997 | Walzer, Jr. .................. 502/117 |
| 5,661,095 A | 8/1997 | Meverden et al. .......... 502/102 |
| 5,834,572 A * | 11/1998 | Derleth et al. ............. 526/126 |
| 5,849,852 A | 12/1998 | Koch et al. .................... 526/96 |
| 6,066,714 A * | 5/2000 | Putzig et al. ................ 528/279 |
| 6,114,479 A * | 9/2000 | Speca et al. ................. 526/147 |
| 6,933,258 B1 * | 8/2005 | Agapiou et al. ............. 502/121 |

FOREIGN PATENT DOCUMENTS

| | | |
|---|---|---|
| EP | 0 017 117 A1 | 10/1980 |
| EP | 0 453 116 A1 | 10/1991 |
| EP | 0 549 252 A1 | 6/1993 |
| EP | 0 560 035 A1 | 9/1993 |
| EP | 0 811 638 A2 | 12/1997 |
| WO | WO 96/08520 | 3/1996 |
| WO | WO 96/11961 | 4/1996 |
| WO | WO 97/06186 | 2/1997 |
| WO | WO 97/14721 | 4/1997 |
| WO | WO 97/15602 | 5/1997 |
| WO | WO 97/27224 | 7/1997 |
| WO | WO 97/46599 | 12/1997 |

OTHER PUBLICATIONS

Patent Abstracts of Japan, vol. 013, No. 015 (C-559), Jan. 13, 1989 & JP 63 221108 A.
XP-002211619, Database WPI, Derwent Publications Ltd., London, GB; AN 1977-87618Y.

* cited by examiner

*Primary Examiner*—J. A. Lorengo
*Assistant Examiner*—J. Pasterczyk
(74) *Attorney, Agent, or Firm*—Kevin M. Faulkner; Lisa Jones

(57) ABSTRACT

The present invention relates to a catalyst composition and a method for making the catalyst composition which comprises a polymerization catalyst and at least one gelling agent. The invention is also directed to the use of the catalyst composition in the polymerization of olefin(s). In particular, the polymerization catalyst system is supported on a carrier.

11 Claims, No Drawings

CATALYST COMPOSITION AND METHODS FOR ITS PREPARATION AND USE IN A POLYMERIZATION PROCESS

CROSS-REFERENCE TO RELATED APPLICATION

This application is a divisional of U.S. patent application Ser. No. 09/998,855, filed Nov. 15, 2001, now U.S. Pat. No. 6,933,258, which claims benefit of provisional application Ser. No. 60/256,744, filed Dec. 19, 2000. Each of the aforementioned related patent applications are herein incorporated by reference.

FIELD OF THE INVENTION

The present invention relates to a catalyst composition, a method for preparing the catalyst composition and its use in a process for polymerizing olefins. In particular, the invention is directed to a method for preparing a catalyst composition comprising or made from a polymerization catalyst and at one gelling agent or organogelator.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization-type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene catalyst systems. Regardless of these technological advances in the polyolefin industry, common problems, as well as new challenges associated with process operability still exist. For example, the tendency for a gas phase or slurry phase process to foul, sheet and/or generate static remains a challenge.

In known continuous gas phase and slurry processes, fouling and sheeting on the walls of the reactor, which act as a heat transfer surface, can result in many operability problems. For example, poor heat transfer during polymerization can result from polymer particles adhering to the walls of the reactor and continuing to polymerize on the walls, thereby leading to premature reactor shutdowns. Also, depending on the reactor conditions, some of the polymer may dissolve in the reactor diluent and redeposit, for example, on the surfaces of metal heat exchangers and again contributing to poor heat transfer and cooling.

Further, fouling, sheeting and/or static generation in a continuous gas phase or slurry process can lead to the ineffective operation of various reactor systems. For example, premature shutdowns can occur when the cooling system of the recycle system, the temperature probes utilized for process control and/or the distributor plates are affected by fouling, sheeting and/or static generation.

Various process operability problems and solutions have been addressed in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid having a molecular weight of at least 300.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene catalyst system and injecting antifoulants or antistatic agents into the reactor; controlling the polymerization rate, particularly on start-up; and reconfiguring the reactor design.

Others in the art to improve process operability have discussed modifying the catalyst system by preparing the catalyst system in different ways. For example, methods in the art include combining the catalyst system components in a particular order; manipulating the ratio of the various catalyst system components; varying the contact time and/or temperature when combining the components of a catalyst system; or simply adding various compounds to the catalyst system. These techniques or combinations thereof are discussed in the literature. Especially illustrative in the art is the preparation procedures and methods for producing bulky ligand metallocene catalyst systems, more particularly supported bulky ligand metallocene catalyst systems with reduced tendencies for fouling and better operability. Examples of these include: WO 96/11961 published Apr. 26, 1996 discusses as a component of a supported catalyst system an antistatic agent for reducing fouling and sheeting in a gas, slurry or liquid pool polymerization process; U.S. Pat. No. 5,283,278 is directed towards the prepolymerization of a metallocene catalyst or a conventional Ziegler-Natta catalyst in the presence of an antistatic agent; U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene catalyst systems; U.S. Pat. No. 5,661,095 discusses supporting a metallocene catalyst on a copolymer of an olefin and an unsaturated silane; PCT publication WO 97/06186 published Feb. 20, 1997 teaches removing inorganic and organic impurities after formation of the metallocene catalyst itself; PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 638 discusses using a metallocene catalyst and an activating cocatalyst in a polymerization process in the presence of a nitrogen containing antistatic agent.

While all these possible solutions might reduce the level of fouling or sheeting somewhat, some are expensive to employ and/or may not reduce fouling and sheeting to a level sufficient to successfully operate a continuous process, particularly a commercial or large-scale process.

Applicants discovered that using a carboxylate metal salt in conjunction with a supported catalyst system, preferably a bulky ligand metallocene catalyst system, more preferably a supported bulky ligand metallocene catalyst system, substantially improves process operability. See for example U.S. patent application Ser. No. 09/397,409, filed Sep. 16, 1999 and U.S. patent application Ser. No. 09/397,410, filed Sep. 16, 1999, which are both herein fully incorporated by reference.

Now, it has been discovered that a new general class of compounds in combination with polymerization catalysts are capable of improving reactor operability. Thus, it is possible to have a polymerization process capable of operating continuously with enhanced reactor operability and at the same time produce new and improved polymers. Now it is also possible to have a continuously operating polymerization process with more stable catalyst productivities, reduced fouling/sheeting tendencies and increased duration of operation.

SUMMARY OF THE INVENTION

This invention provides a method of making a new and improved catalyst composition and for its use in a polymerizing process. The method comprises the step of combining, contacting, blending and/or mixing a catalyst system, preferably a supported catalyst system, with a gelling agent. In one embodiment the catalyst system comprises a conventional-type transition metal catalyst compound. In the most preferred embodiment the catalyst system comprises a bulky ligand metallocene catalyst compound. The combination of the catalyst system and the gelling agent is useful in any olefin polymerization process. The preferred polymerization processes are a gas phase or a slurry phase process, most preferably a gas phase process.

In another embodiment, the invention provides for a method of making a catalyst composition useful for the polymerization of olefin(s), the method including combining, contacting, blending and/or mixing a polymerization catalyst with at least one gelling agent.

In one preferred embodiment, the invention is directed to a catalyst composition comprising a catalyst compound, preferably a conventional-type transition metal catalyst compound, more preferably a bulky ligand metallocene catalyst compound, an activator and/or cocatalyst, a carrier, and a gelling agent.

In yet another embodiment, the invention relates to a process for polymerizing olefin(s) in the presence of a catalyst composition comprising a polymerization catalyst and a gelling agent, preferably the polymerization catalyst comprises a carrier, more preferably the polymerization catalyst comprises one or more of a combination of a conventional-type catalyst compound and/or a bulky ligand metallocene catalyst compound.

In still another embodiment, the invention provides for a process for polymerizing olefin(s) in the presence of a polymerization catalyst having been combined, contacted, blended, or mixed with at least one gelling agent.

DETAILED DESCRIPTION OF THE INVENTION

The invention is directed to a method for making a catalyst composition and to the catalyst composition itself. The invention also relates to a polymerization process having improved operability and product capabilities using the catalyst composition. It has been surprisingly discovered that using a gelling agent in combination with a catalyst system results in a substantially improved polymerization process.

The general class of compounds that are useful in the present invention are gelling agents, which are compounds that are capable of forming thermally-reversible viscoelastic liquid-like or solid-like materials (organogels) in organic liquids (for example, in n-hexane). That is, compounds useful in the invention characteristically form organogels. Specifically, organogels are formed by warming gelling agents in an organic liquid until they dissolve and wherein after dissolution, the solution containing the gelling agent is allowed to stand or cooled until gelation occurs wherein the agent becomes a colloidal aggregate that immobilizes the liquid to a variant degree.

Catalyst Components and Catalyst Systems

All polymerization catalysts including conventional-type transition metal catalysts are suitable for use in the polymerizing process of the invention. But processes that use bulky ligand and/or bridged bulky ligand metallocene catalysts are particularly preferred. The following is a non-limiting description of the various polymerization catalysts useful in the invention.

Conventional Transition Metal Catalysts

Conventional transition metal catalysts are those traditional Ziegler-Natta catalysts and Phillips-type chromium catalyst well known in the art. Examples of conventional transition metal catalysts are discussed in U.S. Pat. Nos. 4,115,639; 4,077,904; 4,482,687; 4,564,605; 4,721,763; 4,879,359; and 4,960,741, all of which are herein fully incorporated by reference. The conventional transition metal catalyst compounds that may be used in the present invention include transition metal compounds from Groups III to VIII, preferably IVB to VIB of the Periodic Table of Elements.

These conventional transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R include alkoxy, phenoxy, bromide, chloride and fluoride.

Non-limiting examples of conventional transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compound.

Conventional chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

Other catalysts may include cationic catalysts such as $AlCl_3$, and other cobalt and iron catalysts well known in the art.

Typically, these conventional transition metal catalyst compounds excluding some conventional chromium catalyst compounds are activated with one or more of the conventional cocatalysts described below.

Conventional Cocatalysts

Conventional cocatalyst compounds for the above conventional transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Group IA, IIA, IIB and IIIA useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amyl-boron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group IIA metals, and mono- or di-organohalides and hydrides of Group IIIA metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

For purposes of this patent specification and appended claims, conventional transition metal catalyst compounds exclude those bulky ligand metallocene catalyst compounds discussed below.

Bulky Ligand Metallocene Catalyst Compounds

Generally, bulky ligand metallocene catalyst compounds include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. In one preferred embodiment, at least one bulky ligand is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^AL^BMQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene catalyst compounds of the invention include those of formula (I) where $L^A$ and $L^B$ are bridged to each other by at least one bridging group, A, such that the formula is represented by

$$L^A A L^B MQ_n \quad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2SiR'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C AJMQ_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D MQ_2(YZ)X_n \quad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In one embodiment, the bulky ligand metallocene catalyst compound is represented by the formula:

$$((Z)XA_t(YJ))_q MQ_n \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur, then Z is optional. In another embodiment, where X is nitrogen or phosphorous then Z is present. In an embodiment, Z is preferably an aryl group, more preferably a substituted aryl group.

Other Bulky Ligand Metallocene Catalyst Compounds

It is within the scope of this invention, in one embodiment, that the bulky ligand metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene catalysts are those Group 5 and 6 metal imido complexes described in EP-A2-0 816 384 and U.S. Pat. No. 5,851,945, which is incorporated herein by reference. In addition, bulky ligand metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Activator and Activation Methods for the Bulky Ligand Metallocene Catalyst Compounds The above described bulky ligand metallocene catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene catalyst compounds or other catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene catalyst compound to a catalytically active bulky ligand metallocene cation. It is within the scope of this invention to use alumoxane or modified alumoxane as an activator, and/or to also use ionizing activators, neutral or ionic, such as tri(n-butyl)ammonium tetrakis(pentafluorophenyl)boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene catalyst compound.

In one embodiment, an activation method using ionizing ionic compounds not containing an active proton but capable of producing both a bulky ligand metallocene catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris(2,2', 2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene catalyst compounds with perchlorates, periodates and iodates including their hydrates. WO 98/30602 and WO 98/30603 incorporated by reference describe the use of lithium(2,2'-bisphenyl-ditrimethylsilicate).4THF as an activator for a bulky ligand metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane)benzimidazolide), which are herein incorporated by reference.

It is also within the scope of this invention that one or more of the above described bulky ligand metallocene catalyst compounds or conventional catalyst compounds can be combined with one or more activators or activation methods described above.

It is further contemplated by the invention that other catalysts can be combined with the bulky ligand metallocene catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene catalyst compounds of the invention have at least one fluoride or fluorine containing leaving group as described in U.S. application Ser. No. 09/191,916 filed Nov. 13, 1998.

In another embodiment of the invention one or more bulky ligand metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Method for Supporting

The above described bulky ligand metallocene catalyst compounds and catalyst systems and conventional-type transition metal catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a bulky ligand metallocene catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 10 to about 500 $\mu$m. More preferably, the surface area of the carrier is in the range of from about 50 to about 500 $m^2/g$, pore volume of from about 0.5 to about 3.5 cc/g and average particle size of from about 20 to about 200 $\mu$m. Most preferably the surface area of the carrier is in the range of from about 100 to about 400 $m^2/g$, pore volume from about 0.8 to about 3.0 cc/g and average particle size is from about 20 to about 100 $\mu$m. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664 and U.S. application Ser. No. 271,598 filed Jul. 7, 1994 and Ser. No. 788,736 filed Jan. 23, 1997 and PCT publications WO 95/32995, WO 95/14044, WO 96/06187 and WO 97/02297 all of which are herein fully incorporated by reference.

Examples of supporting the conventional-type catalyst systems of the invention are described in U.S. Pat. Nos. 4,894,424, 4,376,062, 4,395,359, 4,379,759, 4,405,495 4,540,758 and 5,096,869, all of which are herein incorporated by reference.

It is contemplated that the bulky ligand metallocene catalyst compounds of the invention may be deposited on the same or separate supports together with an activator, or the activator may be used in an unsupported form, or may be deposited on a support different from the supported bulky ligand metallocene catalyst compounds of the invention, or any combination thereof.

There are various other methods in the art for supporting a polymerization catalyst compound or catalyst system of the invention. For example, the bulky ligand metallocene catalyst compound of the invention may contain a polymer bound ligand as described in U.S. Pat. Nos. 5,473,202 and 5,770,755, which is herein fully incorporated by reference; the bulky ligand metallocene catalyst system of the invention may be spray dried as described in U.S. Pat. No. 5,648,310, which is herein fully incorporated by reference; the support used with the bulky ligand metallocene catalyst system of the invention is functionalized as described in European publication EP-A-0 802 203, which is herein fully incorporated by reference; or at least one substituent or leaving group is selected as described in U.S. Pat. No. 5,688,880, which is herein fully incorporated by reference.

In a preferred embodiment, the invention provides for a supported bulky ligand metallocene catalyst system that includes a surface modifier that is used in the preparation of the supported catalyst system, as described in PCT publication WO 96/11960 which is herein fully incorporated by reference.

A preferred method for producing the supported bulky ligand metallocene catalyst system of the invention is described below and can be found in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the bulky ligand metallocene catalyst compound is slurried in a liquid to form a metallocene solution and a separate solution is formed containing an activator and a liquid. The liquid may be any compatible solvent or other liquid capable of forming a solution or the like with the bulky ligand metallocene catalyst compounds and/or activator of the invention. In the most preferred embodiment the liquid is a cyclic aliphatic or aromatic hydrocarbon, most preferably toluene. The bulky ligand metallocene catalyst compound and activator solutions are mixed together and added to a porous support or the porous support is added to the solutions such that the total volume of the bulky ligand metallocene catalyst compound solution and the activator solution or the bulky ligand metallocene catalyst compound and activator solution is less than five times the pore volume of the porous support, more preferably less than four times, even more preferably less than three times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the bulky ligand metallocene catalyst compounds are in the range of between 0.3:1 to 2000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene catalyst system and/or a conventional-type transition metal catalysts of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference. A prepolymerized catalyst system for purposes of this patent specification and appended claim is a supported catalyst system.

Gelling Agents

In the invention, compounds that are useful for combining, contacting and/or mixing with a polymerization catalyst system are generally referred to herein as gelling agents. Gelling agents that are useful in the invention form thermally-reversible viscoelastic liquid-like or solid like materials (organogels) in organic liquids (for example, in n-hexane). Gelling agents form organogels when they are dissolved in an organic liquid and the solution is cooled (or allowed to stand) until gelation occurs wherein the agent becomes a colloidal aggregate that immobilizes the liquid to a variant degree.

Non-limiting examples of gelling agents or organogelators with such characteristics include: aluminum orthophosphates, steroid and anthryl derivatives, amino acid-type gelators, organometallic compounds, quaternary ammonium salts, etc. One preferred gelling agent is tetraoctadecyl ammonium bromide.

Other gelling agents include dihexadecylaluminum ortho phosphate, bicopper tetracarboxylate complex, steroid derivatives such as deoxycholic, cholic, lithocholic acids and their salts, dihydrolanosterol anthryl derivatives, for example 2,3-Bis-n-decyloxyanthracene(DDOA) and related anthraquinone Cholesteryl 4-(2-anthryloxy)butanoate and cholesteryl anthraquinone-2-carboxylate; organometallic compounds such as copper diketonates and carboxylates; Sorbitol and Polyol derivatives salts as are well known in the art as additives for use with polyolefins.

Other preferred gelling agents include phosphate diester compounds such as, for example, $(OH)Al(ROPOR')_2$; $(Et)Al(ROPOR')_2$; $(Et)Al(ROPOR)_2$; and $Mg(ROPOR')_2$, where R is $C_{12-20}H_{21-37}$ and especially $C_{18}H_{33}$ and R' is $CH_3$.

In one embodiment of the invention, the gelling agent excludes those mono- or di- or tri-carboxylic acid salt with a metal portion from the Periodic Table of Elements.

Method of Preparing the Catalyst Composition

The method for making the catalyst composition generally involves the combining, contacting, blending, and/or mixing of a catalyst system or polymerization catalyst with a gelling agent.

In one embodiment of the method of the invention, a conventional-type transition metal catalyst and/or a bulky ligand metallocene catalyst is combined, contacted, blended, and/or mixed with at least one gelling agent. In a most preferred embodiment, the conventional-type transition metal catalyst and/or the bulky ligand metallocene catalyst are supported on a carrier.

In another embodiment, the steps of the method of the invention include forming a polymerization catalyst, preferably forming a supported polymerization catalyst, and contacting the polymerization catalyst with at least one gelling agent. In a preferred method, the polymerization catalyst comprises a catalyst compound, an activator or cocatalyst and a carrier, preferably the polymerization catalyst is a supported bulky ligand metallocene catalyst.

In one embodiment of the method of the invention the gelling agent is contacted with the catalyst system, preferably a supported catalyst system, most preferably a supported bulky ligand metallocene catalyst system under ambient temperatures and pressures. Preferably the contact temperature for combining the polymerization catalyst and the gelling agent is in the range of from 0° C. to about 100° C., more preferably from 15° C. to about 75° C., most preferably at about ambient temperature and pressure.

In a preferred embodiment, the contacting of the polymerization catalyst and the gelling agent is performed under an inert gaseous atmosphere, such as nitrogen. However, it is contemplated that the combination of the polymerization catalyst and the gelling agent may be performed in the presence of olefin(s), solvents, hydrogen and the like.

In one embodiment, the gelling agent may be added at any stage during the preparation of the polymerization catalyst.

In one embodiment of the method of the invention, the polymerization catalyst and the gelling agent are combined in the presence of a liquid, for example the liquid may be a mineral oil, toluene, hexane, isobutane or a mixture thereof. In a more preferred method the gelling agent is combined with a polymerization catalyst that has been formed in a liquid, preferably in a slurry, or combined with a substantially dry or dried, polymerization catalyst that has been placed in a liquid and reslurried.

In an embodiment, the contact time for the gelling agent and the polymerization catalyst may vary depending on one or more of the conditions, temperature and pressure, the type of mixing apparatus, the quantities of the components to be combined, and even the mechanism for introducing the polymerization catalyst/gelling agent combination into the reactor.

Preferably, the polymerization catalyst, preferably a bulky ligand metallocene catalyst compound and a carrier, is contacted with a gelling agent for a period of time from about a second to about 24 hours, preferably from about 1 minute to about 12 hours, more preferably from about 10 minutes to about 10 hours, and most preferably from about 30 minutes to about 8 hours.

In an embodiment, the ratio of the weight of the gelling agent to the weight of the transition metal of the catalyst compound is in the range of from about 0.01 to about 1000, preferably in the range of from 1 to about 100, more preferably in the range of from about 2 to about 50, and most preferably in the range of from 4 to about 20. In one embodiment, the ratio of the weight of the gelling agent to the weight of the transition metal of the catalyst compound is in the range of from about 2 to about 20, more preferably in the range of from about 2 to about 12, and most preferably in the range of from 4 to about 10.

In another embodiment of the method of the invention, the weight percent of the gelling agent based on the total weight of the polymerization catalyst is in the range of from about 0.5 weight percent to about 500 weight percent, preferably in the range of from 1 weight percent to about 25 weight percent, more preferably in the range of from about 2 weight percent to about 12 weight percent, and most preferably in the range of from about 2 weight percent to about 10 weight percent. In another embodiment, the weight percent of the gelling agent based on the total weight of the polymerization catalyst is in the range of from 1 to about 50 weight percent, preferably in the range of from 2 weight percent to about 30 weight percent, and most preferably in the range of from about 2 weight percent to about 20 weight percent.

In an embodiment of the method of the invention, a supported conventional-type transition metal catalyst, preferably a supported bulky ligand metallocene catalyst, is tumbled with a gelling agent for a period of time such that a substantial portion of the supported catalyst is intimately mixed and/or substantially contacted with the gelling agent.

In a preferred embodiment of the invention the catalyst system of the invention is supported on a carrier, preferably the supported catalyst system is substantially dried, pre-formed, substantially dry and/or free flowing. In an especially preferred method of the invention, the preformed supported catalyst system is contacted with at least one gelling agent. The gelling agent may be in solution or slurry or in a dry state, preferably the gelling agent is in a substantially dry or dried state. In the most preferred embodiment, the gelling agent is contacted with a supported catalyst system, preferably a supported bulky ligand metallocene catalyst system in a rotary mixer under a nitrogen atmosphere, most preferably the mixer is a tumble mixer, or in a fluidized bed mixing process, in which the polymerization catalyst and the gelling agent are in a solid state, that is they are both substantially in a dry state or in a dried state.

In an embodiment of the method of the invention, a conventional-type transition metal catalyst compound, preferably a bulky ligand metallocene catalyst compound, is contacted with a carrier to form a supported catalyst compound. In this method, an activator or a cocatalyst for the catalyst compound is contacted with a separate carrier to form a supported activator or supported cocatalyst. It is contemplated in this particular embodiment of the invention, that a gelling agent is then mixed with the supported catalyst compound or the supported activator or cocatalyst, in any order, separately mixed, simultaneously mixed, or mixed with only one of the supported catalyst, or preferably the supported activator prior to mixing the separately supported catalyst and activator or cocatalyst.

In an embodiment, the method of the invention provides for co-injecting an unsupported polymerization catalyst and a gelling agent into the reactor. In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with a gelling agent to a reactor using the injection methods described in PCT publication WO 97/46599, which is fully incorporated herein by reference.

Where a gelling agent and an unsupported bulky ligand metallocene catalyst system combination is utilized, the mole ratio of the metal of the activator component to the metal of the bulky ligand metallocene catalyst compound is in the range of between 0.3:1 to 10,000:1, preferably 100:1 to 5000:1, and most preferably 500:1 to 2000:1.

Polymerization Process

The supported catalyst systems and/or compositions of the invention described above are suitable for use in any prepolymerization and/or polymerization process over a wide range of temperatures and pressures. The temperatures may be in the range of from $-60°$ C. to about $280°$ C., preferably from $50°$ C. to about $200°$ C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to about 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in a specific embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention, including representative advantages thereof, the following examples are offered.

Example 1

Preparation of Catalyst A

Into a 2 gal (7.57 liter) reactor was charged 1060 g of a 30 wt % Methylalumoxane (MAO) solution in toluene available from Albemarle Corp, Baton Rouge La., followed by 1.5 liters of toluene. While stirring 19.8 g of dimethylsilyl-bis(tetrahydroindenyl)zirconium dichloride, a bridged bulky ligand metallocene was added to the reactor as an 8 wt % toluene solution and the mixture was stirred for 60 min. at room temperature to form a pre-mixed catalyst solution. Silica dehydrated at 600° C. available from Crosfield Limited, Warrington, England was then added slowly in one third increments to the pre-mixed solution in the reactor. The mixture was stirred at room temperature for 20 minutes after which 24 grams of Kemamine AS-990 (which has the formula of $(C_{18}H_{37}NCH_2CH_2OH)_2$ and is available from Witco Corp., Memphis, Tenn.) was added to the reactor as a 10 wt % solution in toluene, and stirring continued for an additional 30 minutes at room temperature. The temperature was then raised to 68° C. (155° F.) and vacuum was applied in order to dry the polymerization catalyst. Drying was continued for about 6 hours at low agitation until the catalyst appeared to be free flowing. It was then discharged into a flask and stored under nitrogen atmosphere. The yield was 1050 grams due to some losses during the drying process. Analysis of the catalyst yielded: Zr=0.32 wt %, Al=11.8 wt %.

Comparative Example 2 (CEX 2)

Polymerization Process

A 2 liter autoclave reactor under a nitrogen purge was charged with 0.16 mmoles of triethylaluminum (TEAL) as a scavenger of impurities followed by 25 cubic centimeters cubic centimeters of hexene-1 comonomer and 800 cubic centimeters of isobutane diluent. The content of the reactor was heated to 80° C. after which 100 mgs of the silica supported catalyst prepared as described in Example 1 (Catalyst A) mixed in 10 cubic centimeters of hexane was added to the reactor. The catalyst hexane mixture was introduced concurrently with ethylene into the reactor to make up a total reactor pressure of 325 psig (2240 kPa). The reactor temperature was maintained at 85° C. and the polymerization was allowed to proceed for 40 minutes. After 40 minutes the reactor was cooled, ethylene was vented off and the reactor opened. The reactor walls and stirrer blades were observed for polymer deposits and depending on the extent of fouling material the catalyst was given a rating from 0 to 6; 0 meaning no fouling material was observed on the reactor walls or stirrer blades, and 6 meaning that all polymer granules or particles were deposited onto the walls of the reactor or stirrer (that is, there was no free flowing polymer particles).

Example 2

Example 2 was carried out in a manner similar to comparative example 2 (CEX 2) with the following exception: Prior to adding catalyst A to the reactor, 1 mg (1 wt % based on the weight of the catalyst charged) of tetraoctadecyl ammonium bromide, an organic gelling agent was mixed with the 100 milligrams of catalyst A and the 10 cubic centimeters of hexane. The mixture was then introduced to the reactor concurrently with the ethylene and reaction proceeded as described in Comparative Example 2.

As shown in Table 1, the reactor fouled badly in the absence of the organogelator, while free flowing granules and no wall deposits were seen when the organogelator was present.

TABLE 1

| Example | Gelling Agent | Amount of Gelling Agent Used | Fouling Rating | Comments |
|---|---|---|---|---|
| CEX 2 | None | 0 | 4 | Extensive polymer deposits on walls and stirrer |
| 2 | tetraoctadecyl ammonium bromide | 1 mg | 0 | No wall or stirrer deposits/fouling |

Examples 3–6 and Comparative Examples 3–9

In another evaluation, several materials were investigated to determine whether they exhibited the characteristic of a gelling agent. The gelling agent characteristic was determined by dissolving 2 weight percent of each respective material in 50 ml of n-hexane at ambient or at 5° C. increment up to 100° C. with agitation. After dissolution, the mixture was allowed to stand at ambient (or cool to ambient) without agitation for 5 minutes and was immediately observed for gelation; that is, the various mixtures were visually inspected for the formation of a colloidal dispersion having a viscoelastic liquid-like or solid-like characteristic.

After determining whether the various materials exhibited a gelling agent characteristic, the materials were then evaluated for their respective effects on reactor performance using the procedure described above for Example 2. In this evaluation, comparative example 2 was repeated and designated comparative example 3 (CEX 3). The results of the gelling agent determination and the reactor performance evaluation are shown below in Table 2.

Table 2 indicates that some of the materials exhibited a gelling agent characteristic while others did not. Table 2 also indicates that some of the materials that did not exhibit a gelling agent characteristic (that is, "non-gelling materials"), nonetheless provided improved reactor fouling protection (see CEX 5 and 6) while other non-gelling materials did not provide substantially improved protection (see CEX 7–9). But finally, as we surprisingly discovered, Table 2 further indicates that all of the materials that exhibited a gelling agent characteristic, consistently provided substantially improved reactor fouling protection (that is, the fouling rating was less than 2.0). Thus, to consistently ensure substantially improved reactor protection against fouling and/or sheeting, at least one gelling agent should be used in combination, in contact and/or in a mixture with the polymerization catalyst system. The gelling agent can be combined, contacted or mixed with the polymerization catalyst system prior to or after introduction in to the reactor but preferably the combining, contacting and/or mixing occurs prior to induction in to the reactor.

While the present invention has been described and illustrated by reference to particular embodiments, those of ordinary skill in the art will appreciate that the invention lends itself to variations not necessarily illustrated herein. For example, it is contemplated that a gelling agent can be added to reactor in addition to being contacted with the catalyst system of the invention. For this reason, then, reference should be made solely to the appended claims for purposes of determining the true scope of the present invention.

TABLE 2

| Examples | Materials | Gelling Agent Characteristic | Reactor Fouling Protection | Fouling Rating |
|---|---|---|---|---|
| CEX 3 | None | NA | NA | 5 |
| EX 3 | (OH)Al(ROPOR')$_2$ | Yes | Yes | 0.5 |
| EX 4 | (Et)Al(ROPOR')$_2$ | Yes | Yes | 1 |
| EX 5 | (Et)Al(ROPOR)$_2$ | Yes | Yes | 0.25 |
| EX 6 | Mg(ROPOR')$_2$ | Yes | Yes | 0.25 |
| CEX 4 | ROPOR' | No | No | 3 |
| CEX 5 | (Bu)Mg(ROPOR') | No | Yes | 0.5 |
| CEX 6 | (Et)$_2$Al(ROPOR') | No | Yes | 0.5 |
| CEX 7 | Zn(ROPOR')$_2$ | No | No | 2.5 |
| CEX 8 | (Et)Zn(ROPOR') | No | No | 2 |
| CEX 9 | Product of Fe$_3$O$_4$ + ROPOR' | No, only thickening | No | 2.5 |

NA denotes not applicable.

We claim:

1. A continuous process for polymerizing olefin monomer(s) in a reactor under polymerization conditions, the process comprising the steps of:
    (a) introducing olefin monomer(s) to the reactor;
    (b) introducing a polymerization catalyst composition and at least one gelling agent to the reactor; and
    (c) withdrawing a polymer product from the reactor;
    wherein the gelling agent is selected from of the group consisting of: diester phosphates, steroid and anthryl derivatives, amino acid-containing gelators, and tetraoctadecyl ammonium bromide, and wherein said polymerization catalyst composition comprises catalysts selected from the group consisting of metallocene catalyst compounds.

2. The process of claim 1, wherein the process is a slurry process.

3. The process of claim 1, wherein the process is a gas phase process.

4. The process of claim 1, wherein the gelling agent is contacted with the polymerization catalyst composition prior to its introduction into the reactor.

5. The process of claim 1, wherein the polymerization catalyst composition comprises a carrier.

6. A continuous gas phase process for polymerizing olefin monomer(s) in a reactor, said process comprising the steps of:

(a) introducing a recycle stream into the reactor, the recycle stream comprising one or more olefin monomer(s);
(b) introducing a polymerization catalyst composition and at least one gelling agent into the reactor;
(c) withdrawing the recycle stream from the reactor;
(d) cooling the recycle stream;
(e) reintroducing the recycle stream into the reactor;
(f) introducing into the reactor additional monomer(s) to replace the monomer(s) polymerized; and
(g) withdrawing a polymer product from the reactor;
wherein the gelling agent is selected from of the group consisting of: diester phosphates, steroid and anthryl derivatives, amino acid-containing gelators, and tetraoctadecyl ammonium bromide, and wherein said polymerization catalyst composition comprises catalysts selected from the group consisting of metallocene catalyst compounds.

7. The process of claim 6, wherein the gelling agent is contacted with the polymerization catalyst composition prior to its introduction to the reactor.

8. The process of claim 6, wherein the polymerization catalyst composition comprises a carrier.

9. A continuous process for polymerizing olefin monomer(s) in a reactor under polymerization conditions, the process comprising the steps of:
(a) introducing olefin monomer(s) to the reactor;
(b) introducing a polymerization catalyst composition and at least one gelling agent to the reactor; and
(c) withdrawing a polymer product from the reactor, wherein the gelling agent is a diester phosphate, and wherein said polymerization catalyst is selected from the group consisting of $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot \frac{1}{3}AlCl_3$ and $Ti(OC_{12}H_{25})Cl_3$, $MgTiCl_6(ethyl\ acetate)_4$, chromium catalyst compounds, and metallocene catalyst compounds.

10. A continuous process for polymerizing olefin monomer(s) in a reactor under polymerization conditions, the process comprising the steps of:
(a) introducing olefin monomer(s) to the reactor;
(b) introducing a polymerization catalyst composition and at least one gelling agent to the reactor; and
(c) withdrawing a polymer product from the reactor, wherein the gelling agent is selected from the group consisting of: dihexadecylaluminum ortho phosphate, 2,3-bis-n-decyloxy-anthraquinone, $(OH)Al(ROPOMe)_2$; $(Et)Al(ROPOMe)_2$; $(Et)Al(ROPOMe)_2$; and $Mg(ROPOMe)_2$, where R is $C_{12\text{-}20}H_{21\text{-}37}$, 2,3-bis-n-decyloxy-anthracene, cholesteryl 4-(2-anthryloxy)butanoate and cholesteryl anthraquinone-2-carboxylate, wherein said polymerization catalyst composition comprises catalysts selected from the group consisting of metallocene catalyst compounds.

11. The process of claim 1, 6, 8, or 10, wherein said gelling agent excludes mono- and di- or tri-carboxylic acid salts with a metal counter ion.

* * * * *